United States Patent
Lhuisset et al.

[11] Patent Number: 5,863,142
[45] Date of Patent: Jan. 26, 1999

[54] APPLICATOR DEVICE WITH SELF-TAPPING PISTON

[75] Inventors: Francois Noël Lhuisset, Montgeron; Daniel Foltete; Gérard Normand, both of Besancon, all of France

[73] Assignee: LVMH Recherche, Nanterre, France

[21] Appl. No.: 428,202

[22] PCT Filed: Oct. 25, 1993

[86] PCT No.: PCT/FR93/01041

§ 371 Date: Jun. 16, 1995

§ 102(e) Date: Jun. 16, 1995

[87] PCT Pub. No.: WO94/10481

PCT Pub. Date: May 11, 1994

[30] Foreign Application Priority Data

Oct. 28, 1992 [FR] France .................................. 92 12885

[51] Int. Cl.⁶ .................................................. A45D 40/06
[52] U.S. Cl. ...................... 401/68; 74/89.15; 74/459; 222/390; 222/391; 401/75; 401/172; 401/175; 411/937.2
[58] Field of Search ............................. 401/68, 175, 172, 401/171, 75, 72, 79, 87; 411/937.2; 222/390, 391; 74/459

[56] References Cited

U.S. PATENT DOCUMENTS

| | | | |
|---|---|---|---|
| 1,260,139 | 3/1918 | Brown | 401/171 X |
| 1,701,663 | 2/1929 | Clark | 222/390 |
| 2,578,608 | 12/1951 | Shull | 74/459 |
| 3,557,655 | 1/1971 | Coe | 85/32 |
| 3,570,361 | 3/1971 | Tinnerman | 85/32 |
| 4,019,654 | 4/1977 | Van Manen | 222/1 |
| 4,505,606 | 3/1985 | Lockwood | 401/72 X |

FOREIGN PATENT DOCUMENTS

| | | |
|---|---|---|
| 2659941 | 9/1991 | France . |
| 519479 | 2/1931 | Germany . |
| 121776 | 7/1927 | Switzerland . |

*Primary Examiner*—Steven A. Bratlie
*Attorney, Agent, or Firm*—Pennie & Edmonds LLP

[57] ABSTRACT

The invention relates to an applicator device for applying, e.g., a viscous fluid or a gel, with the use of a self-tapping piston. The device comprises a piston provided with a blade, the cutting edge of which is inclined in relation to the longitudinal axis of a rod passing through the piston. The cutting edge of the blade projects into a space defined in the piston through which the rod passes and bites into the relatively soft, smooth outer surface of the rod as the rod is rotated. The blade cuts into the surface of the rod during such rotation in a substantial spiral direction, causing the piston to move along the rod.

21 Claims, 4 Drawing Sheets

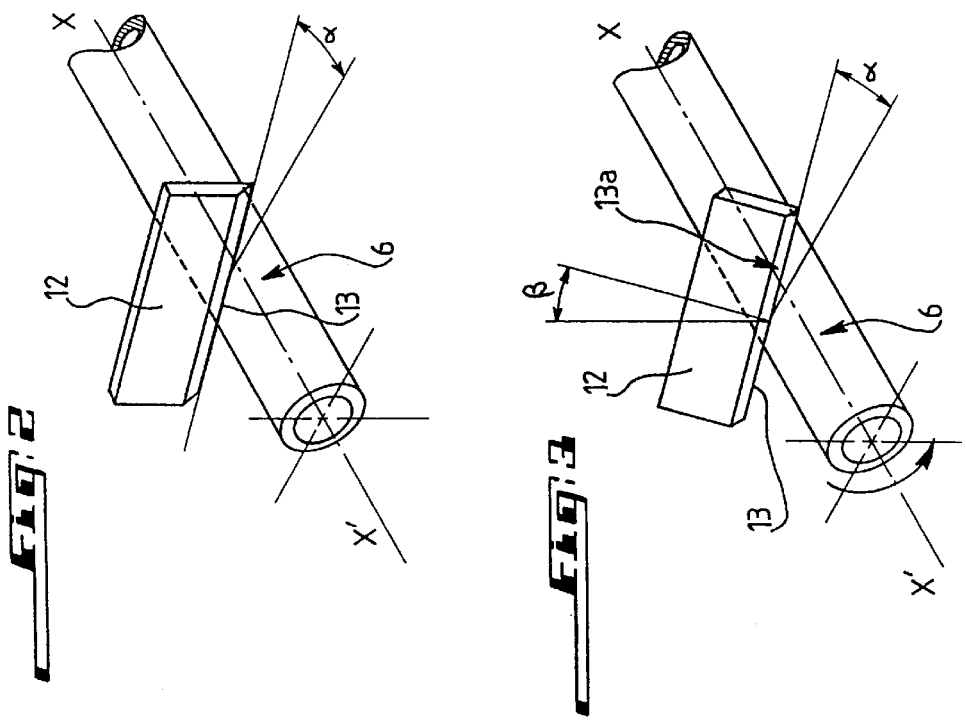
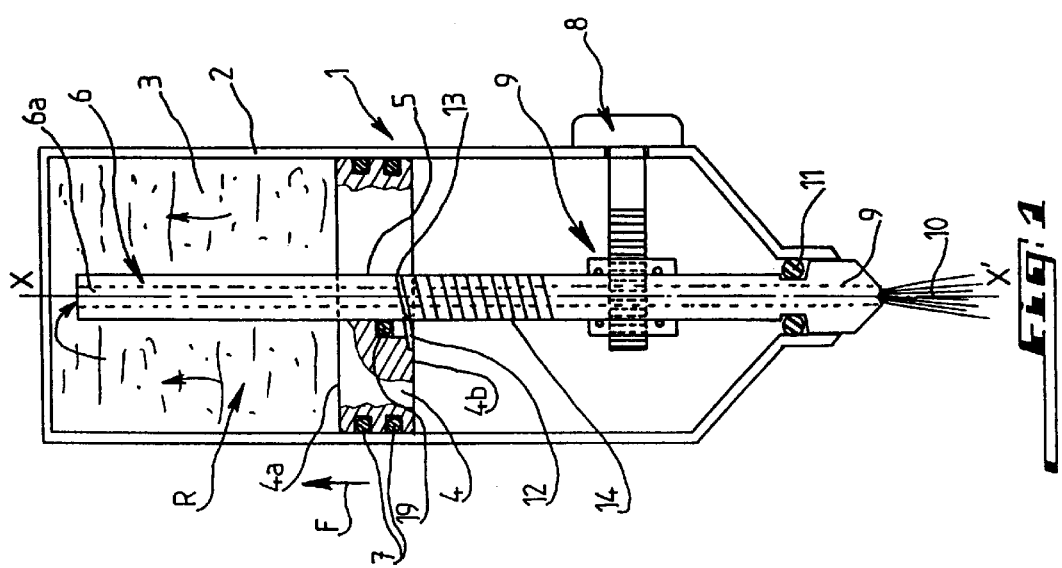

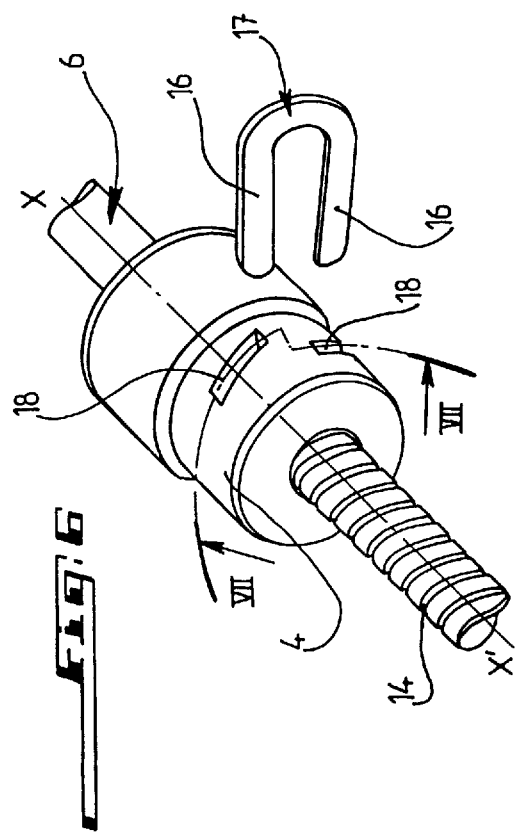
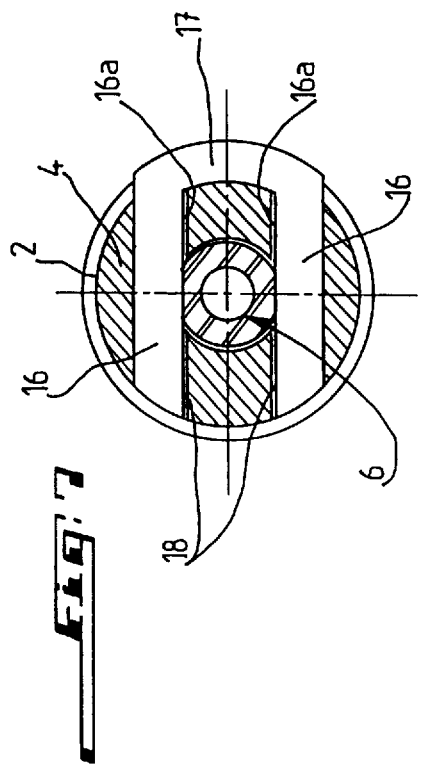
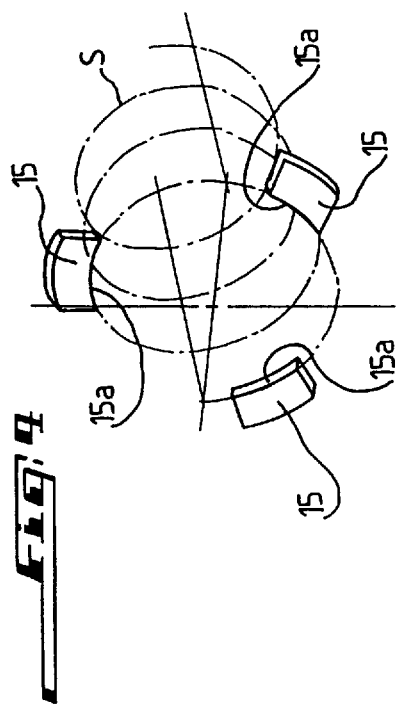
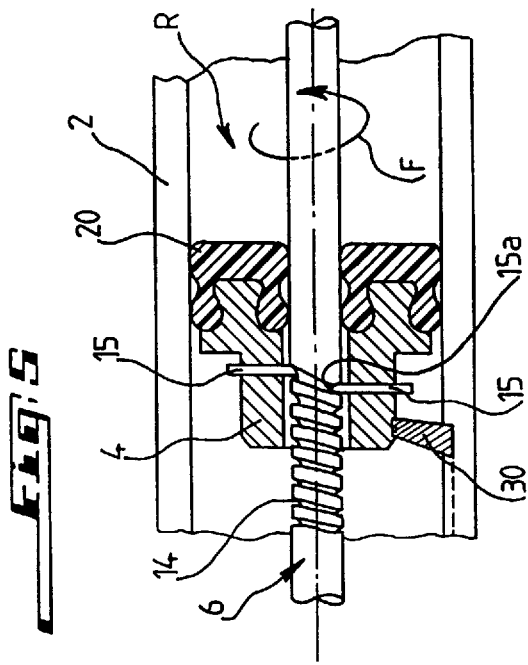

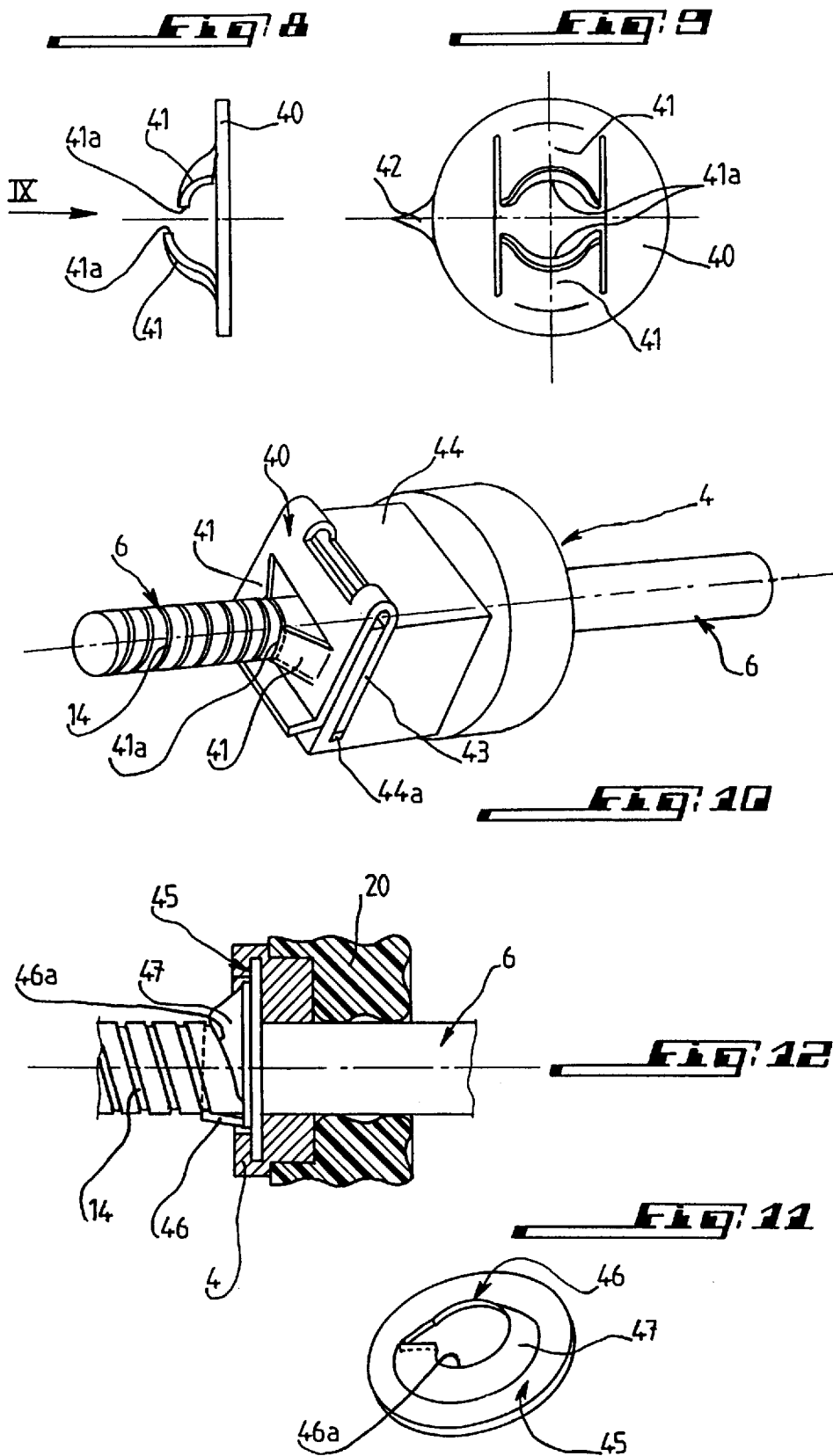

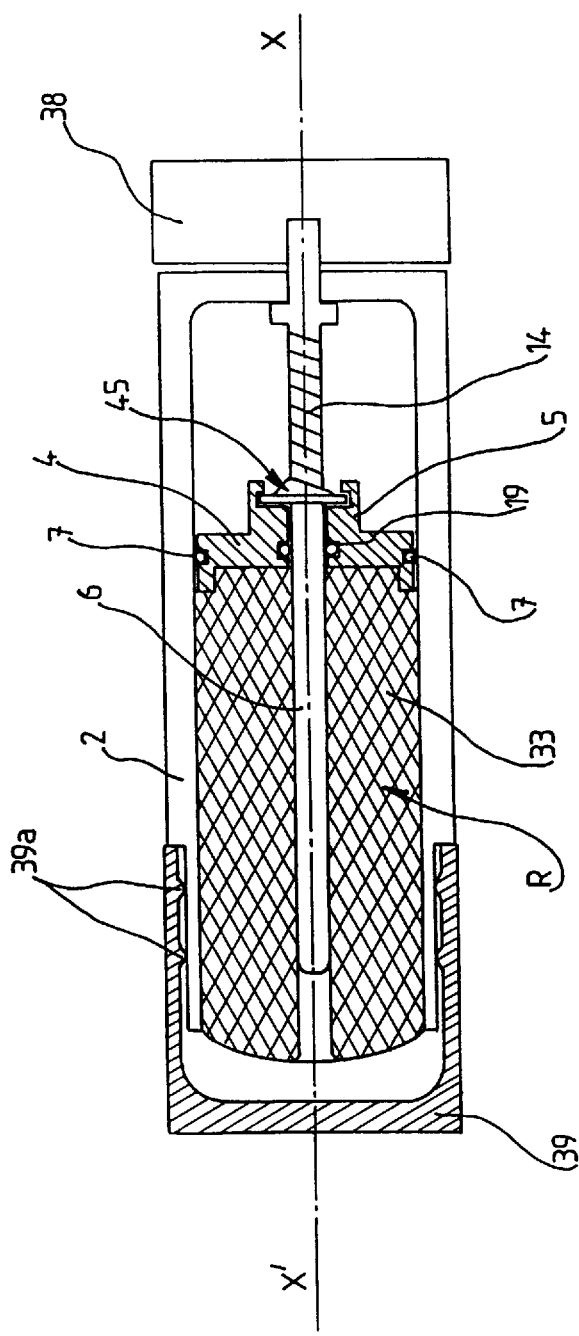

APPLICATOR DEVICE WITH SELF-TAPPING PISTON

FIELD OF THE INVENTION

The present invention relates in a general manner to a device for driving a part in translatory motion by the rotation of a rod or the like extending through the said part.

It relates more particularly to an apparatus for applying a more or less viscous fluid such for example as nail varnish fitted with this device.

BACKGROUND OF THE INVENTION

One knows that the hydraulic jacks consist in general of a rod which pushes a piston in a cylinder. But the bulkiness exhibited by such jacks is about twice the length of the rod thereby constituting an inconvenience when one must use them in an apparatus having necessarily to exhibit a very small bulkiness.

On the other hand one has already proposed systems in which an externally threaded rod extends through a piston held immovable against rotation so that the rotation of the rod permits the translatory motion of the piston along the said rod.

But such a system is not free of drawbacks, in particular in connection with the fluid-tightness between rod and piston, which fluid-tightness often is imperfect let apart the possible fouling of the system.

SUMMARY OF THE INVENTION

Therefore the present invention has as its object to remedy the above-identified drawbacks by proposing a structure driving device adapted to impart all the required fluid-tightness qualities to between rod and piston.

For that purpose and in a general manner the present invention has as its subject a device for driving a part in translatory motion by the rotation of a rod or the like extending through the said part which is held immovable against rotation, characterized in that the said part is provided with at least one blade the cutting edge of which is inclined with respect to the longitudinal axis of the rod and projects sidewise through the aperture of the part through which extends the rod in order to be caused to bite in the external smooth periphery of this rod so as to cut helically therein during its rotation and thus cause the translatory motion of the part along the rod during this rotation.

One therefore already understands that the blade constitutes a simple means to permit the translatory motion of the part under the effect of the rotation of the rod.

According to a first embodiment the blade is mounted in the part so that its plane is substantially perpendicular to the plane tangent to the external side surface of the rod, the said plane being parallel to the cutting edge of the blade.

According to another embodiment the blade is mounted in the part so that its plane is inclined with respect to the plane tangent to the external lateral surface of the rod, the said plane being parallel to the cutting edge of the blade.

One should specify here that in this case the plane of the blade preferably is inclined with respect to the aforesaid tangent plane towards the direction of advance of the aforesaid part.

According to a particular embodiment the cutting edge of the blade may be in the shape of a right-angled dihedron and may be constituted by one arris of an edge of a parallelepipedic plate.

According to still another characteristic of the invention, the inclination of the cutting edge of the blade with respect to the axis of the rod is such that the axial component of the force exerted upon the blade by the effect of the rotation of the rod is clearly greater than the tangential component of this force.

In another embodiment of the invention the blade consists of several blades mounted and arranged in the part so that their cutting edges are directed along a regular cylindrical helix or form one single blade the cutting edge of which follows a regular cylindrical helical line.

The aforesaid blades may be formed of the two mutually confronting legs of a substantially U-shaped deformable member the legs of which are insertable into two apertures, respectively, which are formed obliquely in the aforesaid part and which are axially offset and extend on either side of the axis of the said part.

According to another embodiment the aforesaid blades are cut out in a washer made fast to the aforesaid part.

The washer comprises a folded-back portion which permits it to be hooked onto an element which is attached to the aforesaid part.

In the case of one single blade with a cutting edge of helical shape, this blade may be formed from a plunged boss formed in a washer or the like.

According to still another characteristic of the device according to this invention, the aforesaid part is provided with at least one sealing joint located forward of the aforesaid blade or blades to always co-operate with the external smooth periphery of the rod so that the fluid-tightness between rod and part is maximized.

According to a preferred embodiment the aforesaid part is constituted by a piston which slides in a fluid-tight manner in a hollow body forming a container whereas the rod is actuated for rotation on one side of the piston by a suitable means such as a rotary knob, a push-button or the like, the other side of the piston defining a product tank with the hollow body.

The aforesaid rod may be a hollow rod one end of which opens into the tank.

The device of this invention is further characterized by at least another sealing joint between the periphery of the piston and the wall of the hollow body.

The device of the invention is further characterized by an applicator means such as a paint brush, a brush or a foam, felt or velvet tip mounted on the other end of the hollow rod.

One should further specify here that the other aforesaid end of the hollow rod forms a head projecting from the hollow body and sealed thereto with another sealing joint.

The aforesaid piston-like part could be provided with a cutting element such as a blade which cuts longitudinally into the internal periphery of the hollow body to hold against rotation the piston during its advancing motion within the said hollow body.

The device forming the subject of this invention may advantageously be applied to the provision of an apparatus for applying a more or less viscous fluid such for example as a cream or nail varnish.

BRIEF DESCRIPTION OF THE DRAWINGS

But further advantages and characteristics of the invention will appear better in the detailed description which follows and refers to the attached drawings given by way of example only and in which:

FIG. 1 is an elevational view in axial section of an applicator apparatus fitted with the device according to this invention;

FIG. 2 is a partial and enlarged perspective view illustrating the position of the blade with respect to the rod;

FIG. 3 is a view similar to FIG. 2 but illustrating another type of blade and another relative position of this blade with respect to the rod;

FIG. 4 is a perspective view of another embodiment with several blades arranged along a regular cylindrical helix, the rod being not shown here;

FIG. 5 is a partial view in axial section of the device of the invention comprising the blades of FIG. 4;

FIG. 6 is a perspective view of the device of the invention adapted to be fitted with another embodiment of blade;

FIG. 7 is a view in section along the line VII—VII of FIG. 6 and showing the blades in operative position mounted on the piston;

FIG. 8 is a side view of a washer in which are cut out and shaped the blades arranged according to the invention;

FIG. 9 is a front view of this washer according to the arrow IX—IX of the figure;

FIG. 10 is a perspective view of a piston-shaped part with which is associated a washer similar to that shown on FIGS. 8 and 9;

FIG. 11 is a perspective view of another embodiment of washer;

FIG. 12 is a partial view in axial section of the device of the invention fitted with the washer according to FIG. 11; and FIG. 13 is a view in axial section of an applicator apparatus fitted with a washer according to FIG. 11.

DETAILED DESCRIPTION OF THE PREFERRED EMBODIMENTS

According to the exemplary embodiment shown in FIG. 1, the device according to this invention fits an applicator apparatus 1 essentially comprising a hollow body 2 forming a container for any more or less viscous liquid 3 such as a nail varnish for example.

In the body 2 is axially slidably mounted a piston 4 provided with a central aperture 5 through which extends a rod 6 which is hollow and externally smooth.

This hollow rod 6 opens at one end 6a into a fluid tank R defined by the hollow body 2 and one side 4a of the piston 4 which comprises on its periphery one or more sealing joints such as 7. These joints which are described below, hold the piston 4 immovable against rotation under the effect of the rotation of the operating rod 6 without however preventing the translatory motion of the piston 4 in the body 2.

The rod 6 on the side 4b of the piston 4 is rotatably driven by a knob 8 co-operating with the external periphery of the said rod by any suitable means as shown at 9. The knob 8 may for example rotate and comprises a thread which meshes with a pinion made fast to the rod 6 or the knob 8 may further be a push-button provided with a toothed rack and cooperating with a ratchet wheel made fast to the rod 6 so that an impulse upon the knob 8 causes a short rotation of the rod 6 and therefore a translatory motion of the piston 4 which compresses the liquid 3 within the tank R. Thus as shown by arrows on FIG. 1, the fluid will pass through the rod 6 to flow out through the other end 9 of this rod comprising an applicator brush 10. The end 9 forms in a way a head which projects in a fluid-tight fashion from the hollow body 2 owing to a seal designated at 11 on FIG. 1.

All the arrangements described hereinabove are known per se and do not require detailed explanations.

According to the invention and as one sees it on FIG. 1 in the piston 4 also referred to as a "part" in this description is mounted at least one blade 12 the cutting edge 13 of which is inclined with respect to the longitudinal axis X-X' of the rod 6.

More specifically the cutting edge 13 of the blade 12 projects into the aperture 5 of the part or piston 4 through which extends the rod 6 in order to cause cutting edge 13 to bite into the external smooth and relatively soft periphery of this rod so as to cut helically therein as one sees it at 14 during its rotation and to thus cause the translatory motion of the part 4 along the rod 6 during this rotation. In other words, rotating the externally smooth rod 6 by the knob 8 would generate a threading on this rod which causes the part 4 to move forward in the direction shown by the arrow F.

The angle $\alpha$ (FIGS. 2 and 3) of inclination of the self-tapping cutting edge 13 of the blade 12 with respect to a direction orthogonal to the axis X-X' of the rod 6 should of course be an acute angle so as to permit the formation of the helical groove 14 permitting the displacement of the part or piston 4 which as one will recall is held immovable against rotation for example owing to the sealing joints 7.

This angle $\alpha$ will have such a value that the axial component of the force exerted upon the blade 12 by the effect of the rotation of the rod 6 is greater than the tangential component of this force. For example the axial component which tends to cause the part 4 to move along the rod 6 may be about 5 to 10 times higher than the tangential component which tends to cause the part 4 to turn about the rod 6. This characteristic is particularly important in the case where the part 4 comprises a piston as shown in FIG. 1 and where it is prevented from rotating by the friction forces of the sealing joints 7 against the internal wall of the hollow body 2.

The blade 12 as it appears clearly in FIG. 2 comprises a cutting edge 13 in the shape of a dihedron which is here provided by a simple bevelling, it being understood that a sharpening according to any angle whatsoever of the blade may be provided without departing from the scope of the invention. Moreover one sees in FIG. 2 that the plane of the blade 12 mounted in the part 4 is substantially perpendicular to the external smooth surface of the hollow rod 6, i.e. more specifically to a plane tangent to the external side surface of the rod 6, the said tangent plane being parallel to the cutting edge 13 of the blade 12.

In the embodiment illustrated by FIG. 3, the cutting edge 13 of the blade 12 is in the shape of a right-angled dihedron constituted by one arris of an edge 13a of a parallelepipedic plate. Therefore the blade 12 is here mounted in the part 4 so that its plane is inclined as shown by the angle $\beta$ upon the external surface of the hollow rod 6. More specifically the plane of the blade 12 is inclined with respect to a plane tangent to the external lateral surface of the rod 6, the said tangent plane being parallel to the cutting edge 13 of the blade.

In the embodiment of FIG. 4, the blade comprises a plurality of blades 15, three according to the example shown mounted in the part or piston 4 so that their cutting edges 15a all follow a regular cylindrical helix having the same pitch. Preferably the helices generated by the blades are coincident with one single regular cylindrical helix S thereby reducing the force to be exerted for causing the rod 6 to turn.

These blades 15, as also shown in FIG. 5 may be mounted in the part 4 in any suitable manner not shown. The same is true for case of the blade 12 illustrated in FIGS. 2 and 3.

One clearly sees in FIG. 5 the helical groove 14 formed on the outside of the rod 6 during the rotation of the latter as shown by the arrow F which permits the displacement of the piston 4 towards the right of FIG. 5.

In the alternative embodiment illustrated by FIGS. 6 and 7, the blade comprises two blades 16 constituted by the two mutually confronting legs of a U-shaped member 17. The blades or legs 16 of the U 17 are insertable into two apertures 18, respectively, which are formed in the part 4 and which are actually offset as shown in FIG. 6. Thus the apertures 18 pressure blades 16 onto the surface of rod 6 on either side of its axis x-x' while imparting to these blades a proper inclination on the said axis. As clearly shown in FIG. 7, the mutually confronting edges 16a form the cutting edges of the legs or blades 6 which will cut into the external surface of the hollow rod 6.

It is perfectly possible to provide other embodiments for the blades without departing from the scope of the invention. Thus as shown in FIGS. 8 and 9 the blades may comprise two mutually confronting blades 41 which are cut out in a washer 40 which may be made fast to the part or piston 4 by any suitable means.

For example as shown in FIG. 10 the washer 40 may assume a substantially rectangular shape and be bent over itself so that one folded-back portion 43 of this washer may be hooked onto an element 44 made fast to the part or piston 4. One sees at 44a on FIG. 10 a recess formed in the element 44 and into which is inserted the folded-back portion 43 of the washer 40. It should be noted that the element 4 could also be moulded over the washer 40 the blades 41 of which comprise cutting edges 41a which become engaged with the rod 6 to generate the helical groove 14 therein.

FIGS. 11 and 12 illustrate another embodiment of the washer 45 having a plunged boss 47 defining a blade 46 with a cutting edge 46a of helical shape. This washer 45 as shown in FIG. 12 is mounted for example by having the part or piston 4 being moulded over the said washer.

Reverting to FIG. 1 one sees that the piston 4 is fitted with a packing seal 19 which ensures fluid-tightness between the said piston and the hollow rod 6. As explained at the beginning of this description, the fluid-tightness at this level will always be outstanding owing to the fact that the packing seal 19 co-operates with the smooth periphery of the rod 6 since the helical groove 14 is formed on this rod only behind the packing seal.

FIGS. 5 and 12 illustrate another embodiment of the sealing joint which is comprised of a single sealing joint 20 capable of performing by itself the function of the sealing joints 7 and 19 ensuring the fluid-tightness between the hollow body 2 and the piston 4 and the fluid-tightness between the piston 4 and the hollow body 6, respectively.

Referring again to FIG. 5 one sees that the piston-like part 4 may be provided with a cutting element 30 such as a blade which cuts longitudinally into the internal periphery of the hollow body 2 to advantageously hold the piston 4 immovable against rotation during its advancing motion within the hollow body.

Such a cutting element may also be provided on a washer with cut-out blades shown at 42 on FIG. 9.

The application device of FIG. 1 is operated in accordance with the description provided herein.

The knob 8 could impart to the hollow rod 6 a rotation comprised for example between ¼° and ¹⁄₁₆° of revolution. During this rotation the blade or blades made fast to the piston 4 will cut into the rod 6 according to an angle representing the slope of the helical groove 14.

The tangential component of the force exerted upon the blade by the effect of the rotation of the rod 6 is compensated for by the rubbing of the sealing joint or joints 7 between the piston 4 and the hollow body 2 so that as noted above the sealing joint or joints 7 hold the part 4 immovable against rotation. The axial component is great enough (about 5 to 10 times higher than the tangential component as previously explained to overcome the axial friction forces of the sealing joints of the piston between the piston 4 and the hollow body 2 and between the piston 4 and the rod 6), so as to cause the said piston to move forward in a fluid-tight manner and without any rotation about its axis in the hollow body 2.

Referring to FIG. 13, there is shown an embodiment of the applicator device according to the invention provided with a washer 45 visible in FIG. 11, it being well understood that another type of washer as previously described could be used.

In FIG. 13 the hollow body 2 forming a tank R is open at one of its ends and shaped so as to be capable of receiving a cap 39 co-operating in a fluid-tight manner with the body 2 for example by means of one or several annular bosses 39a.

At the other end of the body 2 and outside thereof a rotary knob 38 is provided which permits rod 6, which in this embodiment is solid, to be rotated.

On rod 6 and in the tank R is retained a solid gel constituting for example a deodorant cosmetic "stick" which will be usable after removal of the cover 39 and actuation of the knob 38.

It should be noted here that the perfect fluid-tightness between the piston 4 and the solid rod 6 as this has been previously explained will advantageously avoid, over time, any desiccation of the product 33 as well as any substantial decrease of its fragrance.

The invention is of course not limited to the embodiments described and illustrated which have been given by way of example only. Thus the angle of sharpening the blades, their number and their flat or curved shape may be of any character without departing from the scope of the present invention. Likewise instead of being hollow the rod for operating the piston could be solid in which case an aperture would be provided in the tank to permit the delivery of fluid. The means for operating this rod may also be any means whatsoever and others than those described and shown. In addition the device according to this invention may find an application in systems or apparatus others than a fluid applicator apparatus.

This means that the invention comprises all the technical equivalents of the means described as well as their combinations if the latter are carried out according to its gist.

We claim:

1. A device for driving in translatory motion a part by the rotation of a rod extending through the part which is held immovable against rotation, wherein said part is provided with at least one blade, the cutting edge of which is inclined with respect to the longitudinal axis (x-x') of the rod and which is caused to bite into the external smooth periphery of said rod so as to cut it helically during its rotation and thus cause the translatory motion of the part along the rod during this rotation.

2. The device according to claim 1, wherein the at least one blade is mounted in the part in such a manner that its plane is substantially perpendicular to a plane tangent to the external side surface of the rod wherein the tangent plane is parallel to the cutting edge of the blade.

3. The device according to claim 1, wherein the at least one blade is mounted in the part in a manner such that its plane is inclined with respect to a plane tangent to the external lateral surface of the rod, said tangent plane being parallel to the cutting edge of the blade.

4. The device according to claim 3, wherein the plane of the at least one blade is inclined with respect to the tangent plane towards the direction of advancing motion of the part.

5. The device according to claim 1, wherein the angle ($\alpha$) of inclination of the cutting edge of said at least one blade with respect to a direction orthogonal to the axis of the rod is such that the axial component of a force exerted upon the at least one blade by the effect of the rotation of the rod is greater than the tangential component of this force.

6. The device according to claim 1, wherein said at least one blade comprises a plurality of blades mounted and arranged in the part such that their cutting edges are directed along a regular cylindrical helix.

7. The device according to claim 6, wherein said blades are formed of two mutually confronting legs of a substantially U-shaped deformable member the legs of which are inserted into two apertures, respectively, which are formed obliquely in the part and which are axially offset and extend on either side of the axis (x-x') of the rod.

8. The device according to claim 6, which further comprises a washer made fast to the part, wherein said blades are cut out from said washer.

9. The device according to claim 8 wherein the washer comprises a folded-back portion which permits it to be hooked onto an element made fast to the part.

10. The device according to claim 6, wherein the blade with a cutting edge having a helical shape comprises a plunged boss formed on a washer.

11. The device according to claim 7 wherein the cutting edge of the at least one blade is in the shape of a right-angle dihedron constituted by one arris of an edge of a parallelepipidic plate.

12. The device according to claim 1, wherein the part is provided with at least one sealing joint located forward of the at least one blade such that said at least one sealing joint cooperates with the external smooth surface of the rod.

13. The device according to claim 1 wherein the part comprises a piston which slides in a fluid-tight manner in a hollow body forming a container, wherein the rod is actuated for rotation on one side of the piston by means for rotating said rod and wherein the other side of the piston defines a product tank within the hollow body.

14. The device according to claim 13, further comprising at least one additional sealing joint located between the periphery of the piston and a wall of the hollow body.

15. The device according to claim 1, wherein the part is provided with a cutting element which cuts longitudinally into the internal periphery of the hollow body to prevent rotation of the piston during its forward motion within the hollow body.

16. The device according to claim 1, wherein the part is a hollow rod, one end of which opens into the tank.

17. The device according to claim 16, which further comprises means for applying a fluid mounted onto the other end of the hollow rod.

18. The device according to claim 16 wherein said other end of the hollow rod forms a head projecting from the hollow body, said head being rendered fluid-tight with said hollow body by an additional sealing joint.

19. The device according to claim 1, which comprises a single blade, having a cutting edge which follows a regular, cylindrical helical line.

20. The device according to claim 1, wherein said device is for applying a viscous fluid.

21. The device according to claim 1, wherein said device is for applying a substantially solid gel.

* * * * *